Sept. 2, 1958     G. W. JACKSON     2,850,276
HYDRO-PNEUMATIC SUSPENSION UNIT
Filed April 11, 1955
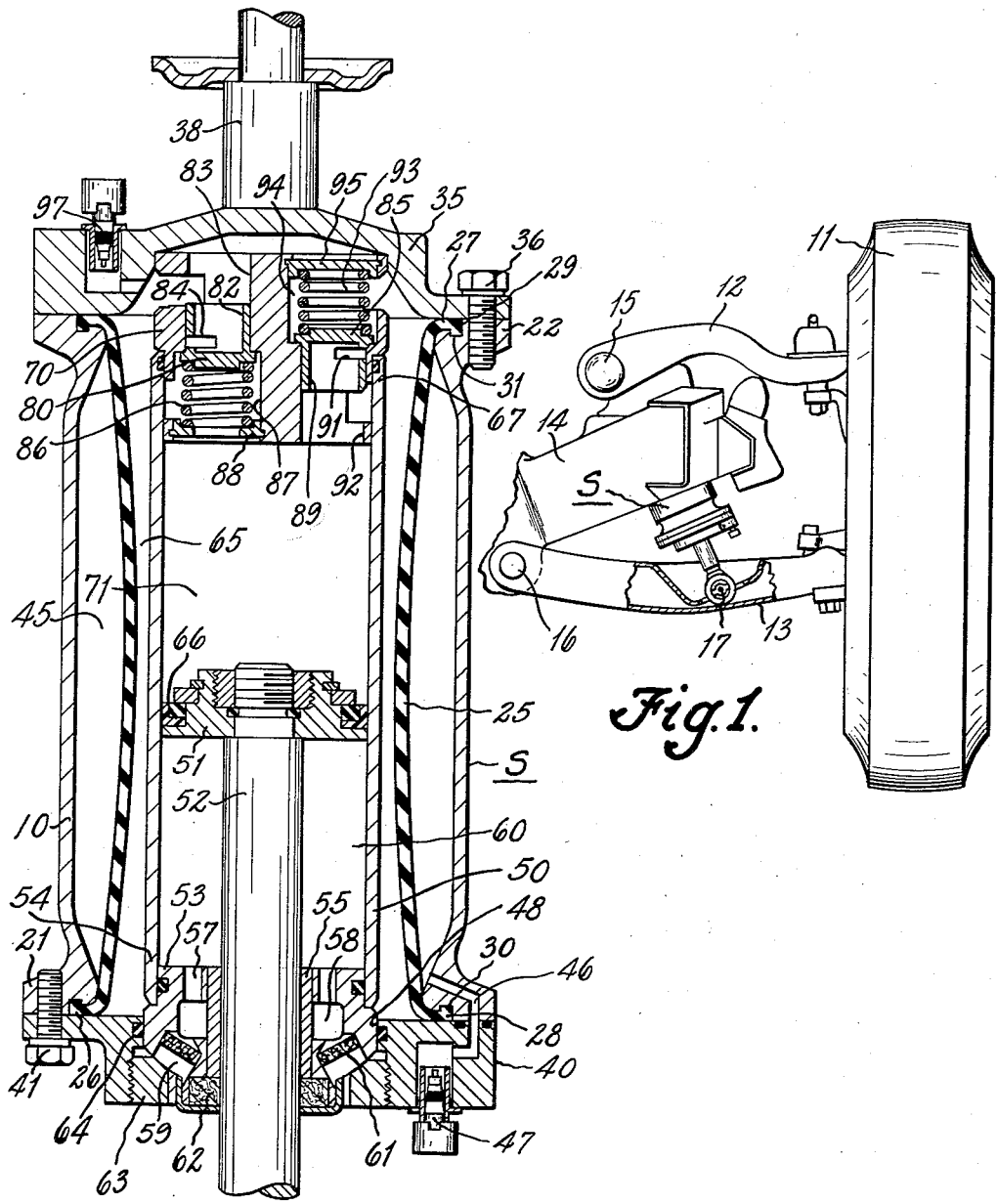
INVENTOR.
GEORGE W. JACKSON
BY
Craig V. Morton
ATTORNEY

United States Patent Office 2,850,276
Patented Sept. 2, 1958

2,850,276

HYDRO-PNEUMATIC SUSPENSION UNIT

George W. Jackson, Dayton, Ohio, assignor to General Motors Corporation, Detroit, Mich., a corporation of Delaware Application April 11, 1955, Serial No. 500,444

4 Claims. (Cl. 267—64)

This invention relates to a hydro-pneumatic suspension unit adapted for use on motor vehicles.

An object of the invention is to provide an improved and simplified construction of a hydro-pneumatic suspension unit that also operates as a shock absorber to dissipate energy created by wheel movement of the vehicle relative to the body of the vehicle.

Further objects and advantages of the present invention will be apparent from the following description, reference being had to the accompanying drawings wherein a preferred form of the invention is clearly shown.

In the drawings:

Figure 1 is an elevational view of a portion of the front end of a motor vehicle illustrating the hydro-pneumatic suspension unit in operative position.

Figure 2 is a longitudinal cross sectional view of the hydro-pneumatic suspension unit of this invention.

The hydro-pneumatic suspension unit "S" of this invention is illustrated in Figure 1 as mounted in position in the suspension system of the front end of a motor vehicle. As illustrated, the motor vehicle wheel 11 is carried between the upper control arm 12 and the lower control arm 13, the upper control arm being pivotally supported on the frame 14 by means of the pivot member 15, the lower control arm 13 being pivoted on the frame 14 by the pivot member 16.

The suspension unit "S" extends between the pivot 15 for the upper control arm and a pivot 17 on the lower control arm 13 whereby the wheel 11 of the vehicle is suspended for normal operation.

The suspension unit "S" comprises an outer housing cylinder 10 having radially extending flange portions 21 and 22 at each of opposite ends of the cylinder 10.

Within the housing cylinder 10 there is disposed an expansible tubular member 25 that is preferably constructed of a rubber-like material. The tubular member 25 has the opposite ends 26 and 27 thereof engaging the radial flanges 21 and 22 respectively with enlarged portions 28 and 29 extending into annular grooves 30 and 31 in the flange portions 21 and 22.

A closure member 35 is provided on the flange portion 22 of the housing cylinder 10, being secured to the flange portion 22 by suitable bolts 36 whereby the end 27 of the tubular wall 25 is retained in sealing engagement with the flange portion 22 of the housing 10. The closure member 35 has a mounting member 38 extending therefrom adapted to be connected with a stationary part of the frame 14 of the vehicle, preferably adjacent the pivot member 15 for the upper control arm 12.

The opposite end of the cylinder housing 10 carries a closure member 40 secured to the flange portion 21 of the housing 10 by means of bolts 41 whereby the end 26 of the expansible tubular wall 25 is retained in sealing engagement with the flange portion 21 of the housing 10.

The structural arrangement thus described provides a sealed or closed chamber 45 between the housing cylinder 10 and the tubular expansible wall 25 that is adapted to receive a gaseous fluid medium held under pressure in the chamber 45. The gaseous fluid medium may be introduced into the chamber 45 by means of a passage 46 provided in the flange 21 and the closure member 40. An inlet valve 47 is provided in the closure member 40 and may be of a conventional construction such as the common type of tire valve used in automotive practice.

The closure member 40 has an opening 48 through which there is inserted a cylinder member 50 that forms the cylinder for a shock absorber in which there is slidably disposed a piston 51. The piston 51 is carried on the end of an operating rod 52 that projects through the closure member 40, a rod guide member 53 being provided in the end 54 of the cylinder 50.

The rod guide member 53 comprises a bearing sleeve 55 that slidably receives the rod 52, the lower end of the rod 52 being provided with an eye 56 that connects with the pivot 17 on the lower control arm of the motor vehicle. The rod guide 53 is provided with passages 57 that connect with the chamber 58 which in turn connects with passages 59 in the rod guide member for connecting the chamber 60 between the piston 51 and the rod guide 53 with atmosphere. A porous filter member 61 is provided in each passage 59 to prevent entrance of dirt into the chamber 60. Also, a felt wiper 62 is provided around the rod 52 to prevent entrance of dirt into the rod guide sleeve 55.

A retaining nut 63 is threadedly received in the closure member 40 to hold the shock absorber cylinder within the housing 10, a seal member 64 being provided between the rod guide member 53 and the closure member 40 to seal this joint and thereby provide a sealed chamber 65 between the expansible tubular wall 25 and the shock absorber cylinder 50.

The piston 51 is provided with a seal 66 that prevents loss of hydraulic fluid from above the piston into the chamber 60.

The end 67 of the cylinder 50 carries a closure member 70 thereby providing a chamber 71 between the closure member 70 and the piston 51. The piston 51 is not provided with any ports or passages and is therefore closed against any flow of fluid between opposite sides of the piston.

The closure member 70 is carried on the end 67 of the cylinder 50 and engages the closure member 35 on the housing cylinder 10 whereby the shock absorber cylinder is retained axially aligned in the housing member 10 between the closure members 35 and 40 for the housing cylinder 10.

The closure member 35 is provided with oppositely acting flow control valves 80 and 85.

The valve 80 comprises a sleeve valve member 82 reciprocable in the bore 83 provided in the closure member 70. The sleeve 82 has a slot 84 in the side wall thereof so that the valve 80 is closed against flow of fluid through the valve when in the position illustrated in Figure 2. A spring 86 retains the valve sleeve 82 in the position illustrated, the spring 86 being held in the spring chamber 87 by means of a retaining ring 88.

Similarly, valve 85 comprises a sleeve valve member 89 that has a slot 91 in the side wall thereof, the sleeve valve 89 sliding in the bore 92 in the closure member 70. A spring 93 retains the valve member 89 in the position shown. The spring 93 is retained in the spring chamber 94 by a spring retainer 95.

An inlet valve 97 is provided in the closure member 35 through which hydraulic fluid is introduced into the chamber 65 for filling the chambers 65 and 71 with a predetermined volume of hydraulic fluid which when placed under a predetermined pressure from a gaseous fluid medium introduced into the chamber 45 and with a predetermined load applied to the suspension unit will dispose the piston 51 in the cylinder 50 in substantially a mid position in the cylinder 50 as illustrated in the drawing.

In operation, the suspension unit illustrated in Figure 2 is adapted to support the vehicle wheel 11 relative to the vehicle frame 14 in the position illustrated in Fig. 1. When the wheel is in the position illustrated, the piston 51 is disposed substantially mid-way between the closure members 53 and 70 for the shock absorber cylinder 50.

The piston 51 is retained in the substantially mid position by means of pressure of a gaseous fluid medium introduced into the chamber 45 whereby the hydraulic fluid that fills the chamber 65 and the chamber 71 is placed under pressure sufficient that when the vehicle is in an at rest position the piston 51 of the shock absorber will be disposed substantially in the mid position illustrated with the load of the vehicle being applied to opposite ends of the suspension unit.

The expansible wall 25 applying pressure to the hydraulic fluid filling the chambers 65 and 71 as a result of the pneumatic pressure retained in the chamber 45 acts as a resilient suspension device for the vehicle. Displacement of hydraulic fluid from the chamber 71 into the chamber 65 through the valve 85 caused by an upward movement of the vehicle wheel 11 will result in flexing of the wall 25 and compression of the gaseous fluid medium in the chamber 45 in direct proportion to the support required under the shock condition. Similarly, when the vehicle wheel 11 moves downwardly, the hydraulic fluid in the chamber 65 will return to the chamber 71 under the influence of re-expansion of the gaseous fluid medium in the chamber 45, the hydraulic fluid passing through the valve 80 in this instance. Thus it will be seen that the normal wheel movements will be resiliently resisted by displacement of the hydraulic fluid between the chambers 71 and 65. Also, the springs 86 and 93 of the control valves 80 and 85 regulate the pressure at which the fluid will be displaced from the chamber 71 into the chamber 65 or vice versa to effect energy absorption and thereby obtain the desired shock absorbing action upon reciprocation of the piston 51 in the cylinder 50 as a result of the movements of the vehicle wheel 11.

While the form of embodiment of the invention as herein disclosed constitutes a preferred form, it is to be understood that other forms might be adopted as may come within the scope of the claims which follow.

What is claimed is as follows.

1. A hydro-pneumatic suspension unit, comprising, housing cylinder, closure means at each of opposite ends of said housing cylinder closing the same, an expansible tubular member in said housing and cooperating therewith to form a closed chamber having an expansible tubular wall, means providing a passage communicating with said chamber for introducing a gaseous fluid medium pressure into said chamber, a shock absorber cylinder in said tubular member and having a piston reciprocable therein connected to an operating rod supported by and extending through one of said closure means, said piston being closed against flow of fluid between opposite sides thereof and separating the shock absorber cylinder into two independent chambers, one of the independent chambers being always in open communication to atmospheric pressure through a separate passage in a portion of said one closure means that supports the operating rod, closure means at the end of said shock absorber cylinder opposite to that through which said operating rod extends, and valve means in said last mentioned closure means controlling flow of hydraulic fluid medium between the chamber provided between the last said closure means and said piston and a chamber formed by cooperation of said shock absorber cylinder and said expansible tubular wall said valve means including first and second annular laterally-open members each spring biased for closure in a direction opposite to the other, the separate atmospheric passage permitting free and unrestricted movement of said piston for flow of hydraulic fluid medium through either of said annular members under influence of one of said spring biased members and the gaseous fluid medium pressure in the first mentioned closed chamber.

2. A hydro-pneumatic suspension unit, comprising, first and second coaxially arranged and radially spaced cylinders, an expansible tubular member disposed longitudinally within the space provided between the said cylinders, opposite ends of said tubular member engaging opposite ends of said first cylinder to form therewith a closed chamber, passage means in said first cylinder for conducting a gaseous fluid medium under pressure into said chamber, a first closure means extending between said cylinders at one end thereof, the inner of said cylinders being open to atmosphere through passage means in the aforesaid first closure means, second closure means on the opposite end of the outer of said cylinders, the opposite end of the inner of said cylinders terminating within said outer cylinder, piston means reciprocable within said inner cylinder connected with rod means extending longitudinally and separately of the passage means through said first closure means adjacent the atmospheric open end of said inner cylinder, and closure means for the opposite end of said inner cylinder including oppositely acting valve means located in passages through said last mentioned closure means to provide for controlled flow of hydraulic fluid from a chamber formed between the said closure means and said piston and a chamber formed between said inner cylinder and said expansible tubular member the passage means open to atmosphere permitting free and unrestricted movement of said piston means for flow of hydraulic fluid medium through either of said oppositely acting valve means only under influence of one of the valve means and the gaseous fluid medium pressure in the first mentioned closed chamber.

3. A hydro-pneumatic suspension unit comprising, a housing cylinder, closure means at each of opposite ends of said housing cylinder closing the same, an expansible tubular member in said housing and cooperating therewith to form a closed chamber having an expansible tubular wall, means providing a passage communicating with said chamber for introducing a gaseous fluid medium pressure into said chamber, a shock absorber cylinder in said tubular member and having a piston reciprocable therein connected to an operating rod supported by and extending through one of said closure means, a rod guide member disposed in said shock absorber cylinder at the end thereof through which said rod extends, said piston being closed against flow of fluid between opposite sides thereof and separating the shock absorber cylinder into two independent chambers, one of the independent chambers being always in open communication to atmospheric pressure through a separate passage means in said rod guide member, closure means at the end of said shock absorber cylinder opposite to that through which said operating rod extends, and valve means in said last mentioned closure means controlling flow of hydraulic fluid medium between the second independent chamber provided between the last said closure means and said piston and a chamber formed by cooperation of said shock absorber cylinder and said expansible tubular wall, said valve means including first and second valve elements each spring biased for closure in a direction opposite to the other, the separate passage means permitting free and unrestricted movement of said piston for flow of hydraulic fluid medium through either of said valve elements under influence of one of said spring biased members and the gaseous fluid medium pressure in the first mentioned closed chamber.

4. A hydro-pneumatic suspension unit, comprising; a housing cylinder, closure means at each of opposite ends of said housing cylinder closing the same, an expansible tubular member in said housing and cooperating therewith to form a closed chamber having an expansible tubular wall, means providing a passage communicating with said chamber for introducing a gaseous fluid medium pressure into said chamber, a shock absorber cylinder in said tubular member and having a piston reciprocable therein, an operating rod connected to said piston and supported by and extending through one of said closure means, a rod guide member disposed in said shock absorber cylinder at the end thereof and having a bearing portion through which said rod extends, said piston being closed against flow of fluid between opposite sides thereof and separating the shock absorber cylinder into two independent chambers, one of the independent chambers being always in open communication to atmospheric pressure through a separate passage means in said rod guide member remote from said bearing portion thereof, closure means at the end of said shock absorber cylinder opposite to that through which said operating rod extends, valve means in said last mentioned closure means controlling flow of hydraulic fluid medium between the second independent chamber provided between the last said closure means and said piston and a chamber formed by cooperation of said shock absorber cylinder and said expansible tubular wall, said valve means including first and second laterally slotted sleeve members each spring biased for closure in a direction opposite to the other, the separate passage means permitting free and unrestricted movement of said piston for flow of hydraulic fluid medium through either of said sleeve members, and a porous filter member provided in the separate passage means to prevent entrance of foreign matter such as dirt into the one independent chamber always in open communication to atmospheric pressure, the porous filter permitting communication to atmospheric pressure so that the piston is restricted only in displacing the hydraulic fluid medium by either one of said laterally slotted spring biased sleeve members and the gaseous fluid medium pressure in the first mentioned closed chamber.

References Cited in the file of this patent

UNITED STATES PATENTS

| | | |
|---|---|---|
| 1,134,224 | Philips | Apr. 6, 1915 |
| 1,142,825 | Lyons | June 15, 1915 |
| 1,512,903 | Brenne | Oct. 28, 1924 |
| 2,571,279 | Myklestad | Oct. 16, 1951 |
| 2,620,182 | Marston et al. | Dec. 2, 1952 |
| 2,661,207 | Allinquant | Dec. 1, 1953 |

FOREIGN PATENTS

| | | |
|---|---|---|
| 953,409 | France | May 23, 1949 |
| 1,076,192 | France | Apr. 24, 1954 |